3,523,980
TRIMERIZATION OF BUTADIENE
David Lee Sullivan, Victoria, Tex., assignor to E. I. du Pont de Nemours and Company, Wilmington, Del., a corporation of Delaware
No Drawing. Filed June 10, 1969, Ser. No. 832,014
Int. Cl. C07c 3/18
U.S. Cl. 260—666                                 7 Claims

ABSTRACT OF THE DISCLOSURE

The trimerization of butadiene to cyclododecatriene-(1,5,9) (CDDT) using a catalyst prepared from an organoaluminum sesquichloride, oxygen and certain tetravalent titanium compounds.

BACKGROUND OF THE INVENTION

The production of cyclododecatriene-(1,5,9) by subjecting butadiene to the action of various catalysts is known. Butadiene trimerization catalysts, based on alkylaluminum chlorides and titanium halides, such as those described in Schneider et al., U.S. Pat. No. 3,076,045, and Wilke, U.S. Pat. No. 2,964,574, Koch et al. U.S. Pat. No. 3,381,045, Eleuterio et al. U.S. Pat. No. 3,381,047, and Brenner U.S. Pat. No. 3,344,199 are known.

SUMMARY OF THE INVENTION

The present invention is an improvement both in rate of reaction, smoothness of operation, simplicity of operation and in ultimate yield over these above-mentioned prior processes involving the use of a certain catalyst system under certain reaction conditions.

The preferred catalyst system is prepared from certain hereinafter defined aluminum sesquichlorides, oxygen and certain hereinafter defined titanium compounds. Catalyst components are preferably limited to these three. For convenience, the exact composition of the organometallic compound may be varied and described as any composition having the following ratio of composition:

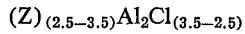

$$(Z)_{(2.5-3.5)}Al_2Cl_{(3.5-2.5)}$$

wherein Z is selected from the class consisting of alkyl radicals containing from 2 to 4 carbon atoms and the phenyl radical. The molar ratio of the aluminum sesquichloride to oxygen should be maintained at from 1/0.1 to 1/0.7 when anhydrous butadiene is used as the starting material with from 1/0.2 to 1/0.6 being the especially preferred range. Naturally, if the butadiene contains oxygen, the amount of oxygen added to the catalyst system should be adjusted so that at no time during the useful life of the catalyst system is the amount of oxygen added such that the total amount present will exceed the ratio of 1.0 mole of aluminum sesquichloride to 0.7 mole of oxygen. The effect of the oxygen is surprising since its effect on the present system is greater than on a system based on diethylaluminum chloride; ethylaluminum dichloride is unsatisfactory for use in a similar trimerization process. Further it had been generally believed that the presence of oxygen was detrimental to the reaction.

The ratio of the aluminum sesquichloride to titanium compound is not so critical. The molar ratio of the aluminum sesquichloride to titanium compound may be varied from 3/1 to 30/1 with ratios of from 5/1 to 15/1 being preferred. Higher ratios may be used but are not desirable because of the expense of the aluminum sesquichloride.

Generally speaking, any tetravalent titanium compound is operable in the present process as long as it is soluble in the reaction medium to an extent of at least 0.01 mole percent as based on cyclododecatriene-(1,5,9) at 20° C. and which compound does not contain a substituent which inactivates the aluminum sesquichloride catalyst. These compounds generally have the formula $TiA_4$ wherein A is selected from the class consisting of Cl, Br and OR, wherein R is a hydrocarboyl radical of from 1 to 20 carbon atoms. The four A's used in a given titanium compound may be the same or different.

The catalyst may be prepared by reacting oxygen with the aluminum sesquichloride followed by reaction of the product so formed with the titanium compound. However, for continuous operation, it is convenient to add all three catalyst components separately and simultaneously to the reaction vessel. If desired, all of the catalyst may be added as gases in separate butadiene streams as by vaporizing either the titanium compound or the aluminum compound and adding the vapor to separate butadiene streams.

The present process is also applicable to the trimerization of substituted butadienes such as isoprene.

In carrying out the present invention, preferably the oxygen may be mixed with inert gases. Thus air may be used as the source of oxygen. The oxygen is conveniently added in the gas phase, with the butadiene.

The butadiene trimerization reaction can be run in any inert organic solvent such as benzene, cyclohexane or hexane. Cyclododecatriene, the reaction product, is an excellent solvent and the preferred one for continuous operation. While use of a catalyst solvent is unnecessary, one may be used to facilitate addition of the catalyst and intimate contact of the reactants.

The butadiene trimerization reaction temperature generally is maintained at from 20 to 120° C. and preferably at from 60 to 90° C. At lower temperatures, the reaction rates become unduly slow and at higher temperatures, increasing yield losses to by-products occur.

Pressure in the instant invention may be varied from ½ atm. to 50 atm. preferably at from 1 to 5 atm.

By operating within the hereinabove set forth limits, butadiene trimer is formed at average reaction rates above 6.0 g./min./mmole of $TiA_4$ present and generally in yield of from 85 to 95 percent, under a total pressure of about one atmosphere and a temperature of about 65–75° C.

When carried out in a continuous manner, the reaction may be made to occur in multiple stages to take advantage of residual catalyst activity.

DESCRIPTION OF THE PREFERRED EMBODIMENTS

Examples I–VII

In each of Examples I–VII a cylindrical reactor with a rounded bottom is used. The liquid volume of the reactor is 1500 ml. up to a side arm for discharge of the crude cyclododecatriene made during steady state operation. The reactor is equipped with a paddle stirrer operated at 500 r.p.m. Temperature is monitored by a thermocouple connected to a thermoregulator which consists of a solenoid valve controlling cooling water flow through coils in the reactor. The temperature is held at 75° C.±1° C. A mercury seal on the off-gas is used to regulate pressure. In each of the examples the reactor is charged with cyclododecatriene, and the temperature is raised to 75° C. while simultaneously injecting ca. 0.002 mol $TiCl_4$ and 0.03 mole aluminum sesquichloride. The cyclododecatriene is saturated with butadiene as the catalysts are added. After the reaction starts (as evidenced by butadiene consumption), the catalyst ratios are adjusted and oxygen addition is incrementally increased until all three components are added in the molar ratios shown in the examples. The crude cyclododecatriene obtained during steady state operation is collected as the reactor overflows through the side arm. The catalyst in the crude reaction product is then deactivated by saturation with anhydrous $NH_3$.

TABLE I

| | I | II | III | IV | V | VI | VII |
|---|---|---|---|---|---|---|---|
| Molar catalyst ratio (CH) Al Cl/TiCl₄/O₂ | 9.9/1/0 | 9.2/1/2.3 | 9.6/1/3.5 | 10.3/1/4.5 | 10.1/1/3.5 | 10.2/1/3.5 | 10.2/1/4.8 |
| Steady state productivity g./crude/l. reactor/ hr | 133 | 811 | 908 | 775 | 908 | 848 | 714 |
| TiCl₄ concentration, g./ml. cyclohexane | 0.7573 | 0.7202 | 0.7202 | 0.7202 | 0.7202 | 0.7202 | 0.7202 |
| Catalyst feed rate, g./l./hr | 0.28 | 0.28 | 0.27 | 0.26 | 0.27 | 0.27 | 0.27 |
| Percent Distribution in Crude (corrected for butadiene and catalyst solvent): | | | | | | | |
| Cyclododecatriene | 63.5 | 86.2 | 88.3 | 86.6 | 85.5 | 87.6 | 84.9 |
| Cyclooctadiene | 1.1 | 2.4 | 2.8 | 2.1 | 2.6 | 2.6 | 2.6 |
| Vinylcyclohexene | 5.0 | 1.4 | 1.5 | 1.3 | 1.7 | 1.7 | 1.3 |
| Non-volatile residue | 24.0 | 8.0 | 7.1 | 9.0 | 9.2 | 8.0 | 9.5 |
| Temperature, °C | 75 | 75 | 75 | 75 | 75 | 75 | 75 |
| Pressure, p.s.i.g | 1.5 | 1.5 | 1.5 | 1.5 | 5 | 1.5 | 1.5 |

The average rate of the reaction throughout a run is given as the number of g./ln of pure cyclododecatriene actually produced. Example I illustrates the poor rate and yield obtained in the absence of oxygen. In Examples II–V oxygen and in Examples VI and VII air is injected into the reaction medium below the liquid level.

Cyclododecatriene is a valuable chemical intermediate which can be readily oxidized to succinic acid which is useful in the production of plastics such as polyamides. It also may be hydrogenated in known manner. Thus, cyclododecene or cyclododecane is obtained from cyclododecatriene. These hydrogenated products may, in turn, be oxidized in known manner to form the corresponding dicarboxylic acids.

I claim:
1. A continuous process for the production of cyclododecatriene-(1,5,9), which consists essentially of charging a reactor with an aluminum compound of the structure

$$Z_{2.5-3.5}Al_2Cl_{3.5-2.5}$$

wherein Z is selected from the class consisting of alkyl radicals containing from 2 to 4 carbon atoms and the phenyl radical, with from 0.1 to 0.7 mole of oxygen per mole of aluminum compound, with a titanium compound of the formula $TiA_4$ wherein A is selected from the class consisting of Cl, Br and OR wherein R is an organic radical of from 1 to 20 carbon atoms, in an amount such that the molar ratio of the aluminum compound to the titanium compound is maintained at from 3/1 to 30/1, and with butadiene and carrying out the reaction at a temperature of from 20 to 120° C. and recovering cyclododecatriene-(1,5,9).

2. The process of claim 1 wherein the molar ratio of the aluminum compound to the titanium compound is from 5/1 to 15/1.

3. The process of claim 2 wherein the titanium compound is titanium tetrachloride.

4. The process of claim 2 wherein the aluminum compound is ethylaluminum sesquichloride.

5. The process of claim 3 wherein the aluminum compound is ethylaluminum sesquichloride.

6. The process of claim 4 wherein from 0.2 to 0.6 mole of oxygen per mole of ethylaluminum sesquichloride is used.

7. The process of claim 5 wherein from 0.2 to 0.6 mole of oxygen per mole of ethylaluminum sesquichloride is used.

References Cited

UNITED STATES PATENTS

| 2,964,574 | 12/1960 | Wilke. |
| 2,979,544 | 4/1961 | Wilke. |
| 3,076,045 | 1/1963 | Schneider. |
| 3,149,173 | 9/1964 | Whittenberg. |
| 3,344,199 | 9/1967 | Brenner. |
| 3,381,047 | 4/1968 | Eleuterio. |
| 3,381,045 | 4/1968 | Koch. |

DELBERT E. GANTZ, Primary Examiner

V. O'KEEFE, Assistant Examiner